Figure 1:
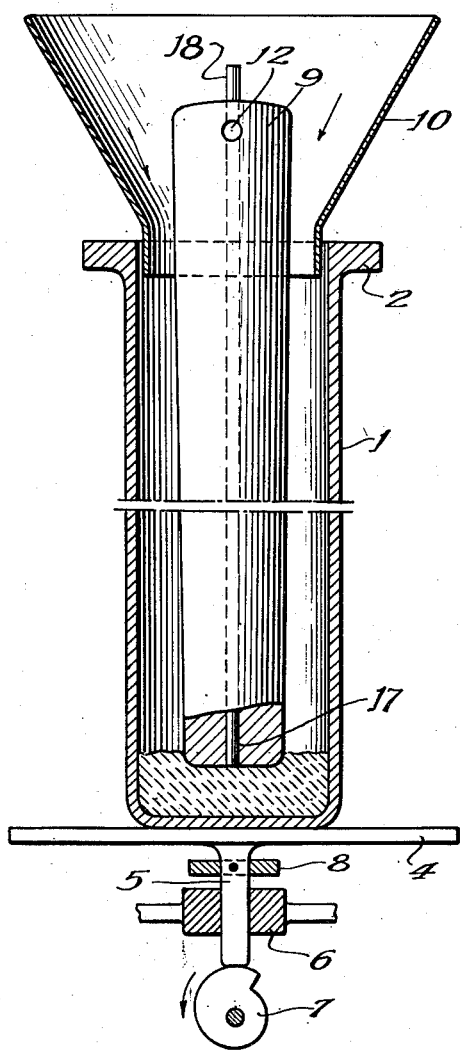

March 12, 1957  H. A. WILHELM  2,785,064
METHOD OF FORMING CRUCIBLES AND REACTION CHAMBERS
FOR PRODUCTION OF URANIUM OF HIGH PURITY
Filed Dec. 8, 1944

Inventor:
Harley A. Wilhelm
By: Robert A. [Lavender]
Attorney.

United States Patent Office 2,785,064
Patented Mar. 12, 1957

2,785,064

METHOD OF FORMING CRUCIBLES AND REACTION CHAMBERS FOR PRODUCTION OF URANIUM OF HIGH PURITY

Harley A. Wilhelm, Ames, Iowa, assignor to the United States of America as represented by the United States Atomic Energy Commission Application December 8, 1944, Serial No. 567,284

1 Claim. (Cl. 75—84.1)

My invention relates to the production and treatment of uranium and particularly to methods of forming suitable crucibles and reaction chambers for the production of uranium in massive form.

In the manufacture of uranium, it has been proposed to reduce finely divided uranium tetrafluoride, $UF_4$, to uranium metal by reacting the fluoride with powdered calcium, Ca, or magnesium, Mg, in a closed crucible or bomb by externally heating the bomb containing these materials as reactants until an exothermic reaction reduces the fluoride to the metal. The metal is separated from other reaction products by gravity, and is collected in the lower portion of the bomb. Great difficulty has been experienced in providing suitable inert refractory linings for the crucible or bomb in which the process is carried out. During the heating to start the reaction of the fluoride with the calcium or magnesium, it is necessary that the reactants be heated uniformly. If thin spots are produced in the crucible lining, the yield of uranium metal is greatly decreased because the reaction starts before the entire mass of the reactants is at optimum temperature, resulting in the loss of uranium by the formation of the uranium in small particles rather than in massive form. The prevention of thin spots requires a lining which is substantially uniform in heat transmission through the lining to the reactants. In addition, the temperature of reaction is quite high, being analogous to that developed in the well-known thermite process, and it is necessary that the crucible lining also have uniform heat transmission properties in the outward direction to prevent the development of hot spots during the reaction which might cause destruction not only of the lining which subjects the metal to contamination but also destruction of the crucible.

The requirements for high purity and substantial freedom from other possible reactants in the crucible lining are extremely exacting. For example, in crucibles having calcined calcium oxide as a lining, the water and other impurity content must be extremely low to prevent contamination of the uranium, and to prevent the formation of products that might cause destruction of the crucible either by direct attack on the calcium oxide or by actual burning through of the crucible under the extreme heat developed by the reaction. Consequently, in preparing the refractory linings for such crucibles, it is very undesirable and often times dangerous to mix binders or other viscous media with the calcium oxide to render the lining self-sustaining prior to introduction of the reactant mixture.

In the manufacture of uranium by reduction from uranium fluoride in a lined iron crucible, the lining of the crucible is used only once and is replaced following each reduction, whereas it is very desirable to use the metal crucible time after time. Any failure of the crucible lining, such as by formation of cracks or breaking away of portions thereof, allows the reactants to penetrate into contact with the iron crucible, resulting in pitting of the inner wall. Actual puncturing or failure of the crucible may occur under such pitting conditions when the pitting is sufficiently deep to allow penetration of the reactants or products. When this occurs, the high temperature reactants are blown at high velocity through the crucible at the point of crucible failure. Such failure produces a very dangerous condition with respect to operating personnel.

Thus, it has been my experience that without the use of binders or the like, only a few of the prepared lined crucibles could be used; and of those suitable for use, the number actually destroyed during the process has been excessive. For example, in certain runs, iron crucibles lined with tamped calcium oxide without binders generally failed after being used only three times, and even then the uranium yield based on the quantity of uranium in the fluoride was lower than desired, and the resulting uranium metal contained an excessive percentage of iron due to pitting of the iron crucible.

The principal object of my invention is to provide suitable refractory linings for crucibles for the manufacture of uranium.

A further object of the invention is to provide a crucible for obtaining uranium by an exothermic reaction which is not subject to failure during use and which will increase the yield of uranium.

A still further object is to provide an improved method of forming refractory crucible linings for uranium manufacture which will withstand the high temperatures of the exothermic reaction, and to provide a method of forming a crucible lining which is rapid and of low cost.

Figure 2:
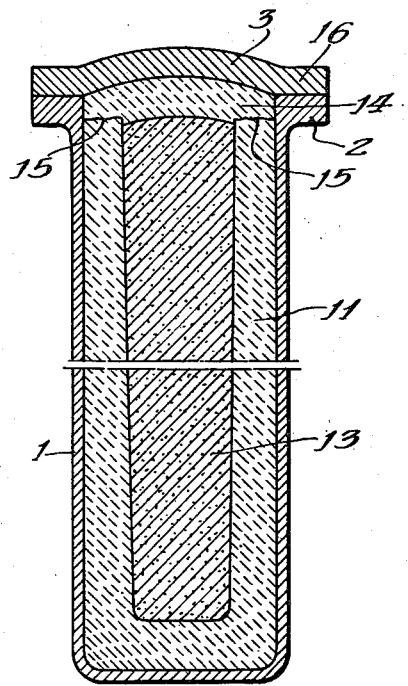

The above and other objects, features and advantages of my invention will become readily apparent to those skilled in the art when taken in connection with the following description and the accompanying drawing wherein:

Fig. 1 is an elevation view partly in cross section of a partially lined crucible and its support showing one step in preparing a crucible lining in accordance with my invention; and Fig. 2 is a similar view showing the completely lined crucible containing a reactant charge.

In accordance with my invention, I use a powdered refractory such as calcined calcium oxide as a crucible lining material, and compact the oxide by mechanically jolting the crucible during the formation of the lining in order to provide a dense cohering mass of the oxide without the addition of any binding materials whatsoever. Thus, no deleterious matter that might combine with or otherwise contaminate the reactant charge or the resultant uranium formed by the exothermic reaction produced in the crucible is added to the lining. In addition, the lining made by my method is so uniformly dense that no burning out or pitting of the crucible occurs and the uranium produced is of higher purity and represents a yield which is higher than heretofore obtained.

It is not known just why the jolting of the calcium oxide is beneficial in producing a compact mass and a satisfactory lining wherein pitting of the iron crucible is practically eliminated. It appears that compressing, tamping or otherwise compacting the oxide by means other than the jolting are not equivalents of jolting. For example, compressing the oxide by tamping, while producing a lining which will maintain its shape until the reactants are placed in the crucible, results during use in very high iron contamination of the uranium, and in frequent failure of the lining and destruction of the crucible. From actual tests on crucibles having linings prepared by different methods, I have found that for calcium oxide linings made by compressing the oxide by tamping, a very high ratio of failure to successful use resulted, so that the iron crucibles could be used on an average of only three times before they became useless because of penetration by the reactants, with attendant danger to operating personnel and loss of the reactants. In addition, the contamination of the uranium by iron pitted from the iron crucible was exceedingly high, resulting in an iron content in the uranium of 140 to 150 parts per million (p. p. m.). However, by following the teachings of my present invention, I have been able to reduce the iron contamination to about 57 p. p. m. and the pitting of the iron crucibles is reduced to only rare occurrences.

For a more complete understanding of my invention reference may be had to the drawing wherein Fig. 1 is an elevation view partly in cross section of a crucible 1 preferably of iron or steel and elongated in shape. The crucibles which I have used with particular success are six inches in diameter and approximately 36 inches in length, and having an outwardly extending flange 2 at its open end to which cap 3 may be clamped or otherwise affixed, as shown in Fig. 2. The crucible 1 is placed on a jolting table 4 shown schematically in Fig. 1. The table 4 is provided with an arbor 5 guided by a bearing 6 and movable in an upward direction by a cam 7. Upon each revolution of the cam, the table and the crucible supported thereby fall by gravity to a solid stop provided by an adjustable collar 8 engaging the top of the bearing 6. One particularly suitable jolting table was adjusted to have a stroke of 1⅜ inches and a jolting rate of 250 per minute.

The preferred method of lining the crucible will now be described in detail. A small quantity of the calcium oxide is placed in the crucible 1 to cover the bottom thereof sufficiently to provide a thickness when compacted by jolting substantially equal to the desired lining thickness along the crucible side walls. The calcium oxide in the bottom of the crucible is then compacted as hereinafter described, and a core form 9 of wood, steel, chromium plated steel, or other material and of circular cross section is then inserted into and positioned centrally of the crucible 1 and supported by the calcium oxide. The preferred lining thickness is determined by the diameter of the form 9, and the form may be provided with a slight downward taper so that it may be removed more readily. Additional calcium oxide is then poured into the space between the form 9 and the crucible 1 such as by an annular funnel 10 which may be so designed as to maintain the form 9 centrally of the crucible, as by lugs (not illustrated) positioning the form 9 centrally of the funnel 10. The jolting table 4 on which the crucible is supported is then started and the calcium oxide subjected to the jolting thereof for a period of 10 to 15 minutes. Jolting causes the oxide to settle, and additional oxide is introduced into the crucible during the jolting until the compacted material forms liner 11 of the approximate height indicated by numeral 15 in Fig. 2. The upper portion of the lining may be compacted by the application of a weight of annular shape which fits between the form 9 and the crucible 1 and rests on the lining material during jolting. For the size and form of the crucible referred to, the jolting produces a compacting of the lining material so that approximately 20 percent more calcium oxide is utilized than can be compacted by mere compression of the oxide in the crucible by previous methods. With my compacting method, I am able to increase the amount of calcium oxide from 18 to 22 pounds for a given lining thickness in the crucible described, thus resulting in a considerable increase in the compactness of the lining material.

When the liner 11 is built up by the vibrating or jolting of the material in situ to a height indicated by numeral 15 approximating one half inch from the flange portion 2, the prepared crucible may be removed from the jolting table and the form 9 removed. The removal of the form 9 may be facilitated by providing a transverse hole 12 through the upper end of the form 9, through which a rod or other member may be passed so that the form may be slightly rotated while being pulled upwardly, the slight taper on the form facilitating its removal. An axial hole 17 extends longitudinally through the core form throughout its entire length to allow air to fill the space below the form during its removal from the crucible. Removable rod 18 fills the hole 17 at the time when the calcium oxide is being poured into the crucible. This rod is so supported in the hole 17 that the bottom end surface of the rod is flush with the bottom end surface of the form 9 as by a collar portion (not illustrated) resting against the top of the form 9. As shown in Fig. 2, a charge 13 may then be introduced into the lined crucible without further treating the lining 11 in any way. Thus, no baking, sintering, or other treatment is necessary, other than the jolting, to provide a well compacted and self-sustaining lining.

The charge 13 comprises an intimate mixture of powdered calcium or magnesium and uranium tetrafluoride, preferably with a slight excess of calcium or magnesium, such as 10 percent, over the stoichiometric combining proportions. The charge materials in a quantity sufficient for one charge are placed in a rotary mixer to assure thorough mixing of the calcium or magnesium with the fluoride and to break up aggregates and provide a good mixture. The charge is then immediately placed in the crucible, the quantity being insufficient to extend above the height of the upper boundary 15 of the lined portion of the crucible. The crucible is then filled with additional calcined calcium oxide 14, which is packed by light tamping over the upper boundaries 15 of the lining 11 and over the charge 13 to completely fill the crucible.

It will be noted that the lining 11 is not initially built to the top of the crucible 1 but is terminated at point 15, and that the reactant charge does not completely fill the lined cavity so that when the additional calcium oxide 14 is introduced into the crucible, the upper boundary of the charge 13 is below the level of contact between the capping material 14 and the lining 11. I thus prefer to provide the lining of insufficient extent to completely cover the wall of the crucible, and I leave the wall clear of lining by an amount slightly less than the lining thickness. In addition, the upper boundary of the charge is made at about a distance equal to the lining thickness from the open end of the crucible so that the thickness of the capped portion 14 is substantially equal to the thickness of the lining 11. This allows more uniform heat exchange between the reactants and the crucible during the external heating and the exothermic reaction steps.

The cap member 3 provided with a flange 16 corresponding to the flange 2 of the crucible is placed over the open end of the crucible and clamped thereto, but it is not sealed, in order that gas or volatile materials may escape from the crucible. The charge is then ready for the reaction producing the uranium metal in massive form.

The closed crucible is placed in a furnace and heated at a temperature of approximately 600° C. to initiate the exothermic reaction within the crucible. The exothermic reaction releases considerable heat and raises the temperature not only of the lining 11, but also of the crucible 1, so that further heating from an external source, such as the furnace referred to above, is unnecessary once the reaction has been initiated. Following the reaction, the crucible is removed from the furnace and allowed to cool to the handling temperature.

When using magnesium as one of the reactants, the reaction with uranium tetrafluoride to form magnesium fluoride and uranium may be represented by the following equation:

$$UF_4 + 2Mg = 2MgF_2 + U$$

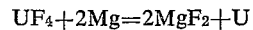

This reaction develops considerable heat as indicated above, and with a tamped crucible lining, the heating thereof is non-uniform because of unequal heat flow to the crucible 1 resulting in hot spots and lining failure. Such lining failure exposes the iron crucible to the high temperature reactants which attach the iron and cause severe crucible pitting or actual penetration and destruction of the crucible.

Following the reaction, and cooling of the crucible, the crucible is opened and the upper calcium oxide lining portion 14 chipped away, whereupon the reduced uranium metal covered with the layer of slag will be found in the bottom of the crucible. The lining 11 is then chipped away from the crucible walls and the slag and uranium removed. Following cleaning of the crucible, it may be relined in the manner described above, refilled with the reactants and used again since, when following the teachings of my invention, no material pitting of the metal crucible occurs.

I have previously mentioned the requirement that the calcium oxide must be dry, and that the presence of moisture therein may cause difficulty in obtaining the desired reaction. It appears that the presence of moisture is conductive to a water regenerative cycle in the calcium oxide lining of the crucible. Water reacts with uranium tetrafluoride to form uranium oxide and hydrogen fluoride, which latter reacts with calcium oxide to form calcium fluoride and water. Such a reaction may be represented by the equations:

$$2H_2O + UF_4 = UO_2 + 4HF$$
$$4HF + 2CaO = 2CaF_2 + 2H_2O$$

Some of the water may be reduced by the magnesium to form magnesium oxide with evolution of hydrogen, which latter can escape through the joint between the flanges 2 and 16 since a sealed joint is not provided and the lining is sufficiently porous to allow diffusion of the hydrogen therethrough. However, even with very small amounts of water present, uranium oxide is produced rather than the metal itself, with consequent reduction in uranium yield. Thus, as indicated above, it is of great importance that the lining contains little or no water or water containing binders, and this is readily accomplished when such linings are made in accordance with my invention.

While I do not wish to be limited by any theory which might explain the improved properties of the crucible lining made in accordance with my invention when used in the preparation of uranium metal, it may be that the prolonged jolting releases the air adsorbed on the surface of the calcium oxide particles causing a far more compact mass than can be obtained by a mere compressing action. It also appears that the particles of calcium oxide are flaky, and the jolting causes the flakes to become aligned with one another. Such alignment decreases the voids between the particles and also increases the compactness or packing density of the mass. Consequently, the particles pack more closely together and form a uniformly heat conducting and heat dissipating lining that is sufficiently dense and strong to withstand the vigorous reaction and the high temperatures developed in the exothermic reaction.

While I have described my invention with particular reference to calcined calcium oxide used as a lining, other powdered materials, such as fused calcium oxide, calcined or fused dolomite, may be used in lining crucibles for conducting the reaction described above. Additionally, other dry powdered refractory materials may be formed into crucible linings by the method of the invention, the choice of material being dictated by the reaction which is to be conducted in the crucible. Furthermore, it will be appreciated that other changes and modifications of my invention will at once suggest themselves to those skilled in the art, and that my invention is not limited to the particular example described nor to the other features and modifications thereof set forth except as required by the appended claim.

I claim:

The method of forming a reaction chamber adapted for containing a uranium-containing mixture during exothermic reaction thereof consisting of providing an iron chamber of selected configuration, blocking off space of selected thickness for wall lining, filling the blocked-off space with a material consisting of binder-free anhydrous powdered calcium oxide, jolting the chamber until the powdered calcium oxide has settled into a dense mass, adding additional powdered calcium oxide and continuing to jolt the chamber until a substantially complete bottom and side wall lining is obtained, replacing the blocking-off means with a uranium-containing mixture, and adding anhydrous powdered calcium oxide for the topmost portion of the side wall lining and jolting the chamber again while applying a weight to the entire surface of said topmost portion.

References Cited in the file of this patent

UNITED STATES PATENTS

| | | |
|---|---|---|
| Re. 22,050 | Crespi | Mar. 24, 1942 |
| 211,488 | Adams | Jan. 21, 1879 |
| 1,072,495 | Priest | Sept. 9, 1913 |
| 1,106,905 | Weber | Aug. 11, 1914 |
| 1,318,452 | Keyes | Oct. 14, 1919 |
| 1,321,125 | Pfanstiehl | Nov. 11, 1919 |
| 1,415,516 | Bridge | May 9, 1922 |
| 1,542,784 | Deppeler | June 16, 1925 |
| 1,567,445 | Lubowsky | Dec. 29, 1925 |
| 1,704,257 | Marden et al. | Mar. 5, 1929 |
| 1,789,943 | Meloche | Jan. 20, 1931 |

FOREIGN PATENTS

| | | |
|---|---|---|
| 230,865 | Great Britain | Dec. 10, 1925 |

OTHER REFERENCES

A. Roderburg: "Zeitsch. anorg. Chemie," vol. 81 (1913), pp. 122–129.

Goggin, Cronin, Fogg, and James: "Industrial and Eng. Chem." (February 1926), pp. 114–116.